(12) United States Patent
Baier et al.

(10) Patent No.: US 8,566,748 B2
(45) Date of Patent: Oct. 22, 2013

(54) METHOD AND SYSTEM OF A HUMAN-MACHINE INTERFACE

(75) Inventors: John Joseph Baier, Mentor, OH (US); Karen Kui, Surrey (CA); Kevin George Gordon, Vancouver (CA); Mark David Hobbs, Hartford, WI (US); Monte Leroy Fevang, Surrey (CA); Teunis Hendrik Schouten, Langley (CA)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 357 days.

(21) Appl. No.: 12/473,085

(22) Filed: May 27, 2009

(65) Prior Publication Data

US 2010/0306692 A1 Dec. 2, 2010

(51) Int. Cl.
*G06F 3/048* (2013.01)
*G06F 3/00* (2006.01)

(52) U.S. Cl.
USPC ........... 715/838; 715/771; 715/779; 715/788; 715/810; 715/835; 715/777; 715/840

(58) Field of Classification Search
USPC ......... 715/764, 766, 767, 771, 777, 778, 779, 715/788, 792, 810, 835, 838, 840
See application file for complete search history.

(56) References Cited

U.S. PATENT DOCUMENTS

2004/0225955 A1* 11/2004 Ly ................................. 715/500
2008/0022229 A1* 1/2008 Bhumkar et al. ............. 715/838

* cited by examiner

*Primary Examiner* — Nicholas Augustine (57) ABSTRACT

A human-machine interface system for an industrial automation environment is provided. The human-machine interface system includes a communication interface configured to receive machine data from an aggregation server, a user interface configured to display graphical data to a user, and a processor coupled to the communication interface and the user interface. The processor is configured to process the machine data to produce first graphical data including a first human-machine interface including one or more tabs, transmit the first graphical data to the user interface for display, and detect a pointer indicating an interest over one of the one or more tabs. The processor is also configured to process the machine data to produce second graphical data including the first human-machine interface including an open drawer corresponding to the one of the one or more tabs, and transmit the second graphical data to the user interface for display. The drawer includes a thumbnail graphic of a second human-machine interface.

19 Claims, 8 Drawing Sheets

METHOD AND SYSTEM OF A HUMAN-MACHINE INTERFACE

TECHNICAL BACKGROUND

Automation environments typically include a quantity of machines monitored and controlled by human-machine interfaces. These human-machine interfaces may be configured to control the machines while displaying automation data related to the present or past states of the machines. The interfaces may vary widely in complexity as required by particular machines and automation environments.

Within any given industrial automation environment, human-machine interfaces may be configured to have a wide variety of ranges and scales. For example, human-machine interfaces may be configured in a hierarchical system where different interfaces display the environment at different scales. An initial human-machine interface may illustrate the overall environment, while other interfaces may drop down the hierarchy and illustrate individual systems or individual machines within a system.

OVERVIEW

A human-machine interface system for an industrial automation environment is provided. The human-machine interface system includes a communication interface configured to receive machine data from an aggregation server, a user interface configured to display graphical data to a user, and a processor coupled to the communication interface and the user interface. The processor is configured to process the machine data to produce first graphical data including a first human-machine interface including one or more tabs, transmit the first graphical data to the user interface for display, and detect a pointer indicating an interest over one of the one or more tabs. The processor is also configured to process the machine data to produce second graphical data including the first human-machine interface including an open drawer corresponding to the one of the one or more tabs, and transmit the second graphical data to the user interface for display. The drawer includes a thumbnail graphic of a second human-machine interface.

A method for operating a human-machine interface is provided. The method includes receiving machine data from an aggregation server, processing the machine data to produce first graphical data including a first human-machine interface including one or more tabs, and transmitting the first graphical data to a user interface for display. The method also includes detecting a pointer indicating an interest over one of the one or more tabs, processing the machine data to produce second graphical data including the first human-machine interface including an open drawer corresponding to the one of the one or more tabs, and transmitting the second graphical data to the user interface for display. The drawer includes a thumbnail graphic of a second human-machine interface.

A computer-readable medium having instructions stored thereon for operating a computer system is provided. The instructions, when executed by the computer system, direct the computer system to receive machine data from an aggregation server, process the machine data to produce first graphical data including a first human-machine interface including one or more tabs, and transmit the first graphical data to a user interface for display. The instructions also direct the computer system to detect a pointer indicating an interest over one of the one or more tabs, process the machine data to produce second graphical data including the first human-machine interface including an open drawer corresponding to the one of the one or more tabs, and transmit the second graphical data to the user interface for display. The drawer includes a thumbnail graphic of a second human-machine interface.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, there is no intent to limit the disclosure to the embodiment or embodiments disclosed herein. On the contrary, the intent is to cover all alternatives, modifications, and equivalents.

DETAILED DESCRIPTION

Figure 1:
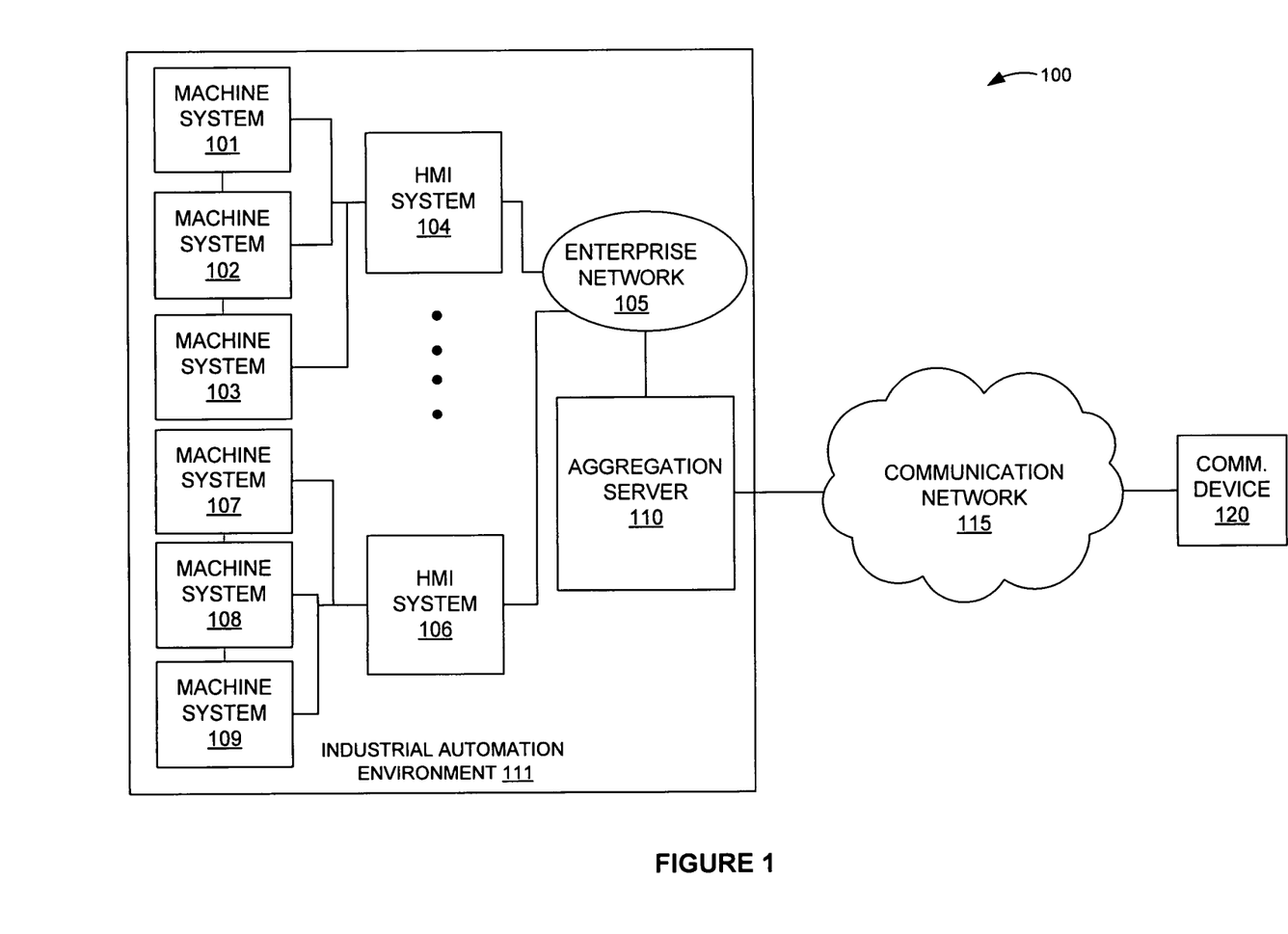
FIG. 1 is a block diagram illustrating an industrial automation system configured for the display of graphical representations of industrial automation environments.

FIG. 1 is a block diagram illustrating an industrial automation system 100 configured for the display of graphical representations of industrial automation environments. In this example industrial automation system 100 industrial automation environment 111 is connected to communication device 120 through communication network 115. Industrial automation environment 111 contains multiple machine systems 101, 102, 103, 107, 108, and 109, multiple humane-machine interface (HMI) systems 104 and 106, an enterprise network 105, and an aggregation server 110.

Industrial automation environment 111 communicates with communication network 115 through aggregation server 110. Aggregation server 110 communicates with human-machine interface (HMI) systems 104 and 106 through enterprise network 105. Machine systems 101, 102, and 103 are coupled with HMI system 104, and machine systems 107, 108, and 109 are coupled with HMI system 106.

HMI systems 104 and 106 receive machine data from the machine systems and create a graphical display representing their respective machine systems. This graphical display allows human operators to easily visualize the status of each machine system and to control the machine systems through the HMI systems. In many industrial automation environments, machine systems 101 through 109 may be coupled together in a variety of different configurations. These configurations may change as the industrial automation environment is modified for the production of different articles and as machine systems are updated, repaired, or replaced.

HMI systems 104 and 106 are configured to monitor machine systems 101 through 109 for changes in configuration and to send data concerting those changes to aggregation server 110 through enterprise network 105. Aggregation server 110 is configured to generate a graphical representation of industrial automation environment 111 and to transmit the graphical representation to communication device 120 through communication network 115. In some embodiments, aggregation server 110 may be located outside of industrial automation environment 111. For example, it may exist on a data server within communication network 115, or may be independent and communicate to industrial automation environment 111 through another communication network. Communication device 120 is configured to display the graphical representation to a user and to respond to user commands received at a user interface within communication device 120. Communication device 120 may be configured to both receive data from industrial automation environment 111 and also to send commands and data to industrial automation environment 111.

Further, in some embodiments, security measures may limit the data received by communication device 120 from industrial automation environment 111 according to a security level of communication device 120 or a user of communication device 120. Likewise, security measures may limit the data and commands allowed to be sent by communication device 120 to industrial automation environment 111 according to a security level of communication device 120 or a user of communication device 120.

Enterprise network 105 and communication network 115 may be any local or wide area network capable of transferring data from one computer system to another. For example, enterprise network 105 may be a local area network (LAN) with limited or no connections to machines outside of industrial automation environment 111, while communication network 115 may be the Internet with connections to machines throughout the world.

The methods, systems, devices, processors, equipment, and servers described above may be implemented with, contain, or be executed by one or more computer systems. The methods described above may also be stored on a computer readable medium for execution by a computer system. Many of the elements of industrial automation system 100 may be, comprise, or include computer systems. This includes, but is not limited to machine systems 101-109, human-machine interface systems 104 and 106, aggregation server 110, and communication device 120. These computer systems are illustrated, by way of example, in FIG. 2.

Figure 2:
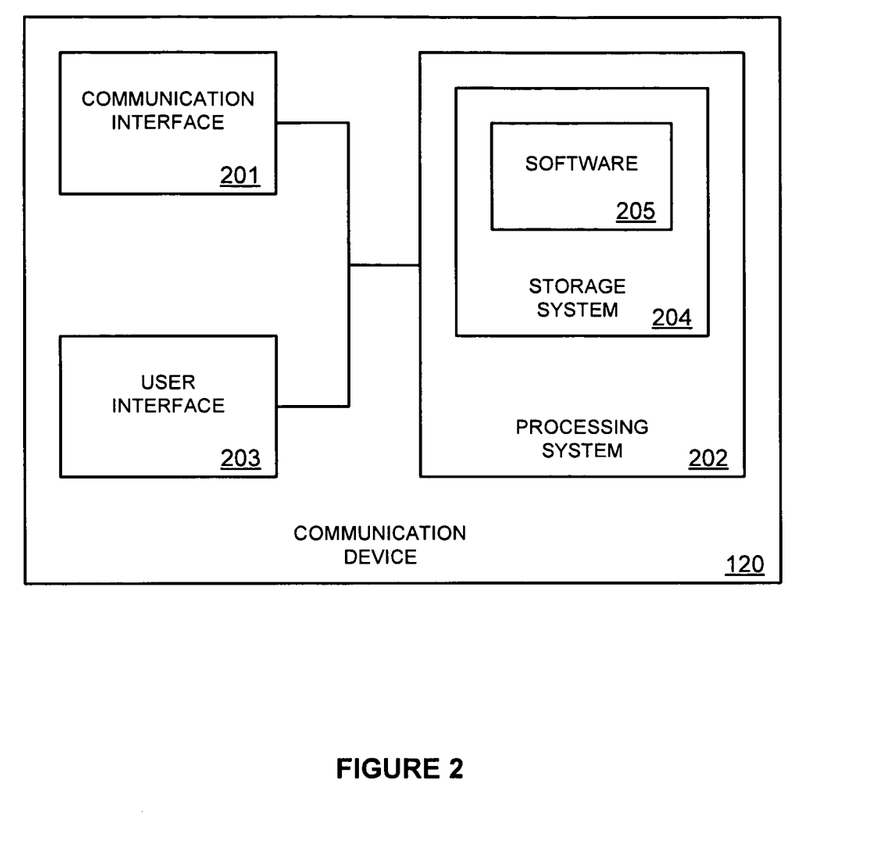
FIG. 2 is a block diagram illustrating a communication device configured for the display of graphical representations of industrial automation environments.

FIG. 2 is a block diagram illustrating a communication device 120 configured for the display of graphical representations of automation environments. Communication device 120 includes communication interface 201, processing system 202, and user interface 203. Processing system 202 includes storage system 204. Storage system 204 stores software 205. Processing system 202 is linked to communication interface 201 and user interface 203. Communication device 120 could include a programmed general-purpose computer, although those skilled in the art will appreciate that programmable or special purpose circuitry and equipment may be used. Communication device may be distributed among multiple devices that together comprise elements 201-205.

Communication interface 201 could include a network interface, modem, port, transceiver, or some other communication device. Communication interface 201 may be distributed among multiple communication devices. Processing system 202 could include a computer microprocessor, logic circuit, or some other processing device. Processing system 202 may be distributed among multiple processing devices. User interface 203 could include a keyboard, mouse, voice recognition interface, microphone and speakers, graphical display, touch screen, or some other type of user device. User interface 203 may be distributed among multiple user devices. Storage system 204 could include a disk, tape, integrated circuit, server, or some other memory device. Storage system 204 may be distributed among multiple memory devices.

Processing system 202 retrieves and executes software 205 from storage system 204. Software 205 may include an operating system, utilities, drivers, networking software, and other software typically loaded onto a computer system. Software 205 could include an application program, firmware, or some other form of machine-readable processing instructions. When executed by processing system 202, software 205 directs processing system 202 to operate as described herein.

Figure 3:
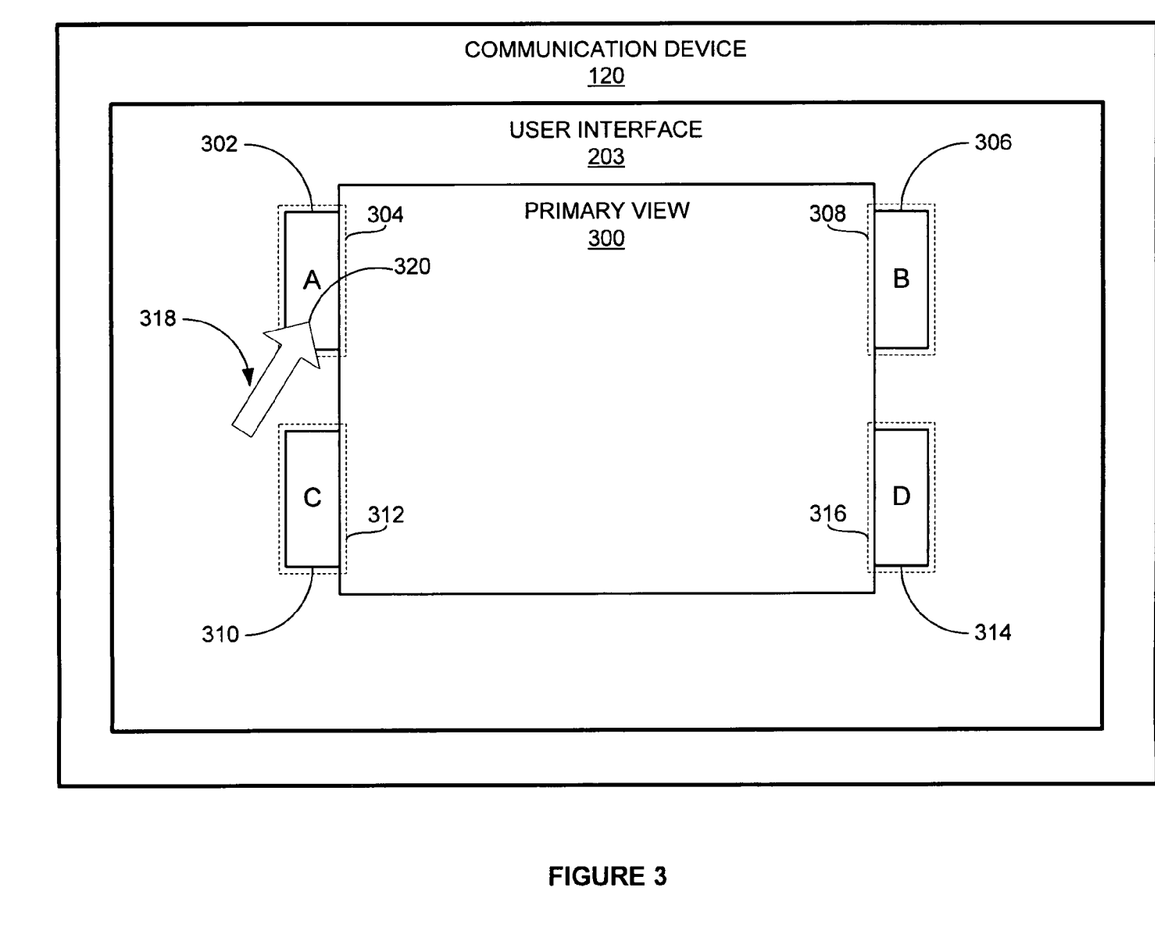
FIG. 3 is a block diagram illustrating a communication device in the process of displaying a graphical representation of an industrial automation environment.

FIG. 3 is a block diagram illustrating communication device 120 in the process of displaying a graphical representation of industrial automation environment 111. In this example, communication device 120 displays a graphical representation of industrial automation environment 111 via user interface 203. User interface 203 is illustrated here as a display configured to display graphical representations to a user. User interface 203 may also include user input devices such as a mouse or keyboard, allowing a user to send commands to communication device 120.

User interface 203 displays a graphical representation of some or all of industrial automation environment 111 including primary view 300, tab A 302, tab B 306, tab C 310, and tab D 314. Primary view 300 is a human-machine interface configured to display machine data to a user and to allow a user to control the display of data. Each tab corresponds to a drawer containing a graphical representation of some or all of industrial automation environment 111. The graphical representation also includes a pointer 318 having an active point 320 indicating an interest over tab A 302. In this example, tab A 302 also includes tab A 304, tab B 306 also includes boundary B 308, tab C 310 also includes boundary C 312, and tab D 314 also includes boundary D 316. While boundaries A through D are represented in FIG. 3 by dashed lines for illustrative purposes, other examples may use other markings or no marking at all to represent these boundaries.

When active point 320 of pointer 318 hovers within boundary A 304, tab A 302 is activated and drawer A is opened. Indicating an interest may include any of a variety of actions related to a user's interest in tab A 302, such as hovering, a mouse click, a key press, a vocal command, or the like. For example, indicating an interest may be defined as the presence of active point 320 hovering within boundary A 304 for a unit of time, or as the presence of active point 320 at a fixed location within boundary A 403 for a unit of time, or the like. When communication device 120 detects that active point 320 of pointer 318 has been indicating an interest within a boundary, it is configured to open the drawer corresponding to that boundary.

Figure 4:
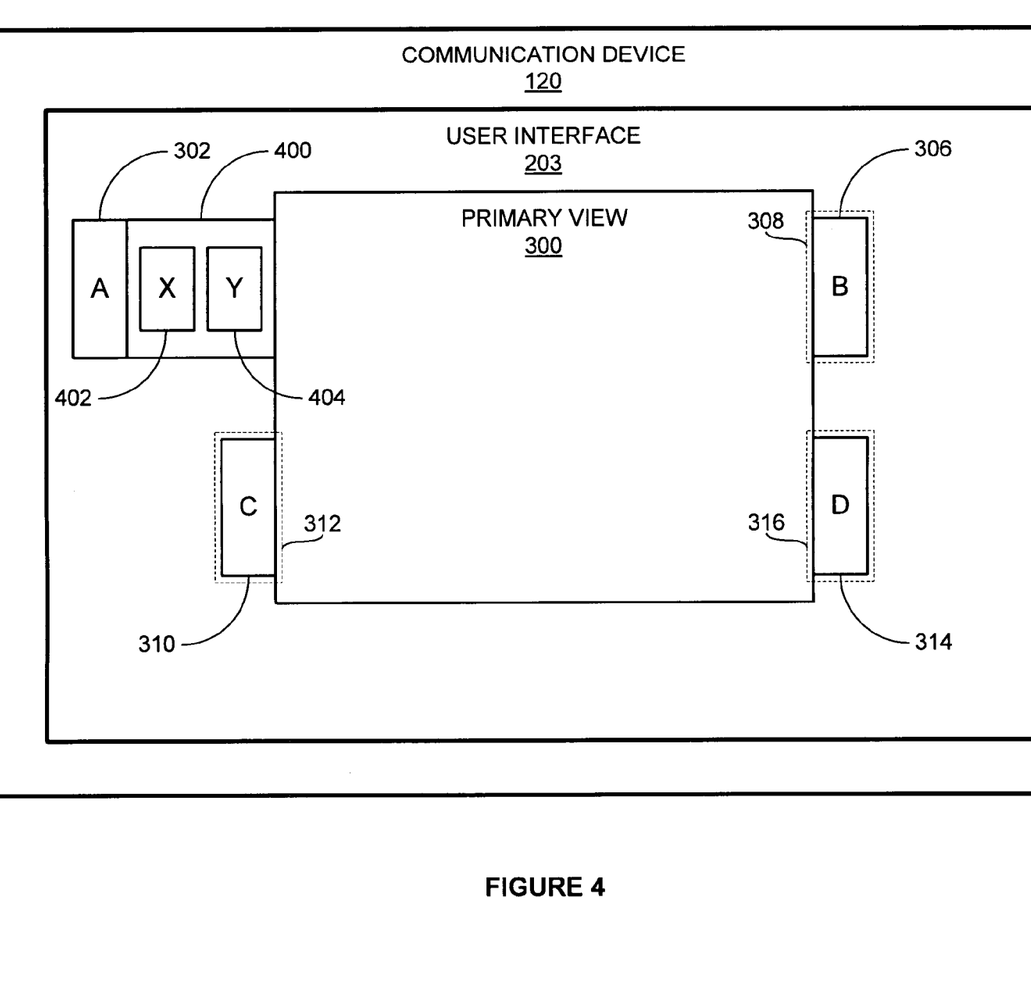
FIG. 4 is a block diagram illustrating a communication device in the process of displaying a graphical representation of an industrial automation environment.

FIG. 4 is a block diagram illustrating communication device 120 in the process of displaying a graphical representation of industrial automation environment 111. In this example, active point 320 of pointer 318 has been hovering within boundary A 304, and communication device 120 has responded by displaying a graphical representation of industrial automation environment 111 similar to that of FIG. 3, but with drawer A 400 opened. Drawer A 400 is attached to tab A 302 and includes a thumbnail graphic of another human-machine interface containing some or all of industrial automation environment 111 including system X 402 and system Y 404. System X 402 and system Y 404 may correspond to any or all of machine systems 101 through 109 illustrated in FIG. 1. The thumbnail graphic of the human-machine interface within drawer A 400 may also show connections between systems along with any of a wide variety of machine data.

In this example, drawer A 400 includes two systems. Other examples may include any number of systems or machines within drawer A. When drawer A 400 is opened, tab B 306, tab C 310 and tab D 314 remain unchanged. In this example, primary view 300 may be thought of as a first human-machine interface.

Figure 5:
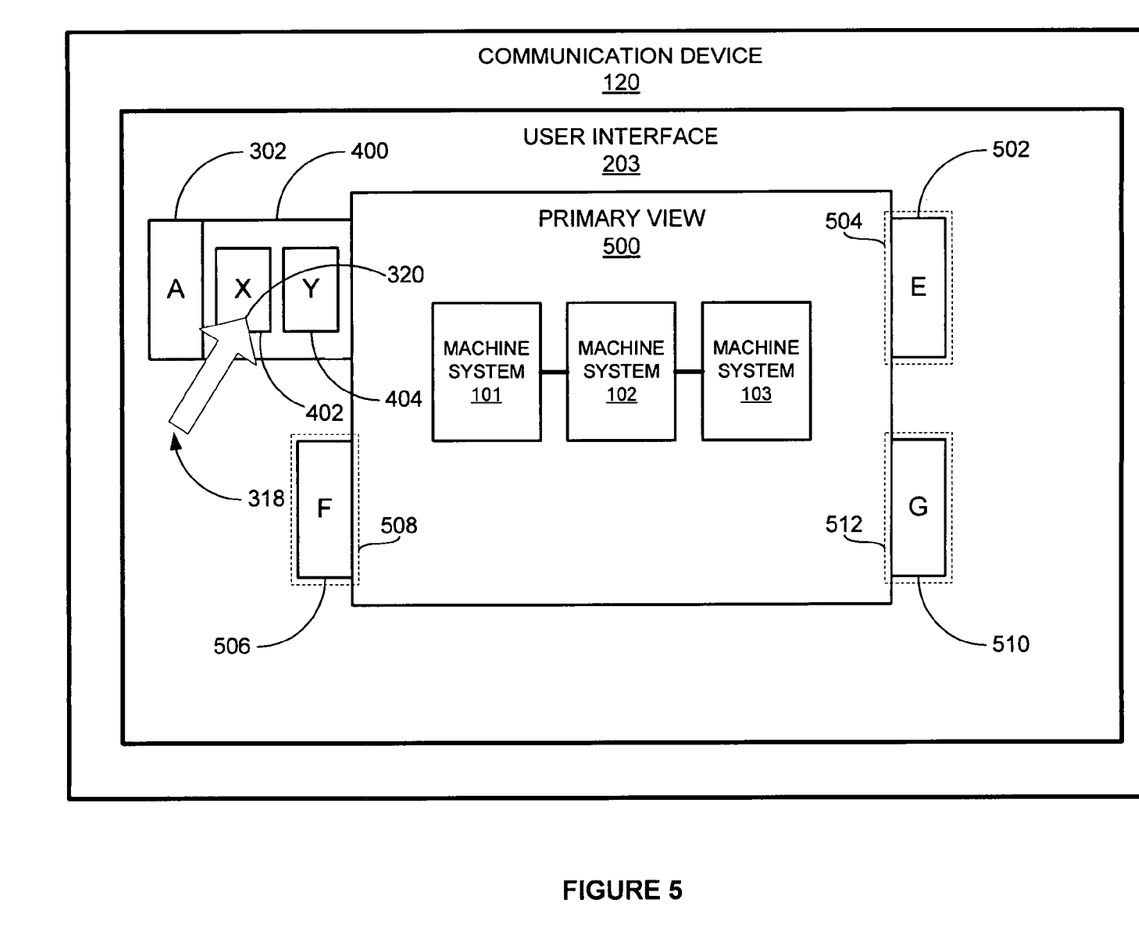
FIG. 5 is a block diagram illustrating a communication device in the process of displaying a graphical representation of an industrial automation environment.

FIG. 5 is a block diagram illustrating communication device 120 in the process of displaying a graphical representation of industrial automation environment 111. FIG. 5 is similar to FIG. 4 with the exception that the user has now selected system X 402 from within the systems displayed in drawer A 400. In response to this selection primary view 500 now contains a human-machine interface representation of system X 402 including machine system 101, machine system 102, machine system 103 and the connections between the machine systems. Primary view 500 may also include any of a wide variety of machine data (not shown) related to machine systems 101 through 103. In this example, primary view 500 may be thought of as a second human-machine interface.

In this example, once system X 402 was selected, primary view 500 was configured such that tab B 306 and boundary B 308 have been replaced by tab E 502 and boundary E 504. Tab C 310 and boundary C 312 have been replaced by tab F 506 and boundary F 508, while tab D 314 and boundary D 316 have been replaced by tab G 510 and boundary G 512. This change has occurred since the user has selected system X 402 for closer inspection and the tabs and drawers now contain thumbnail graphics of other systems and human-machine interfaces related to system X 402.

Figure 6:
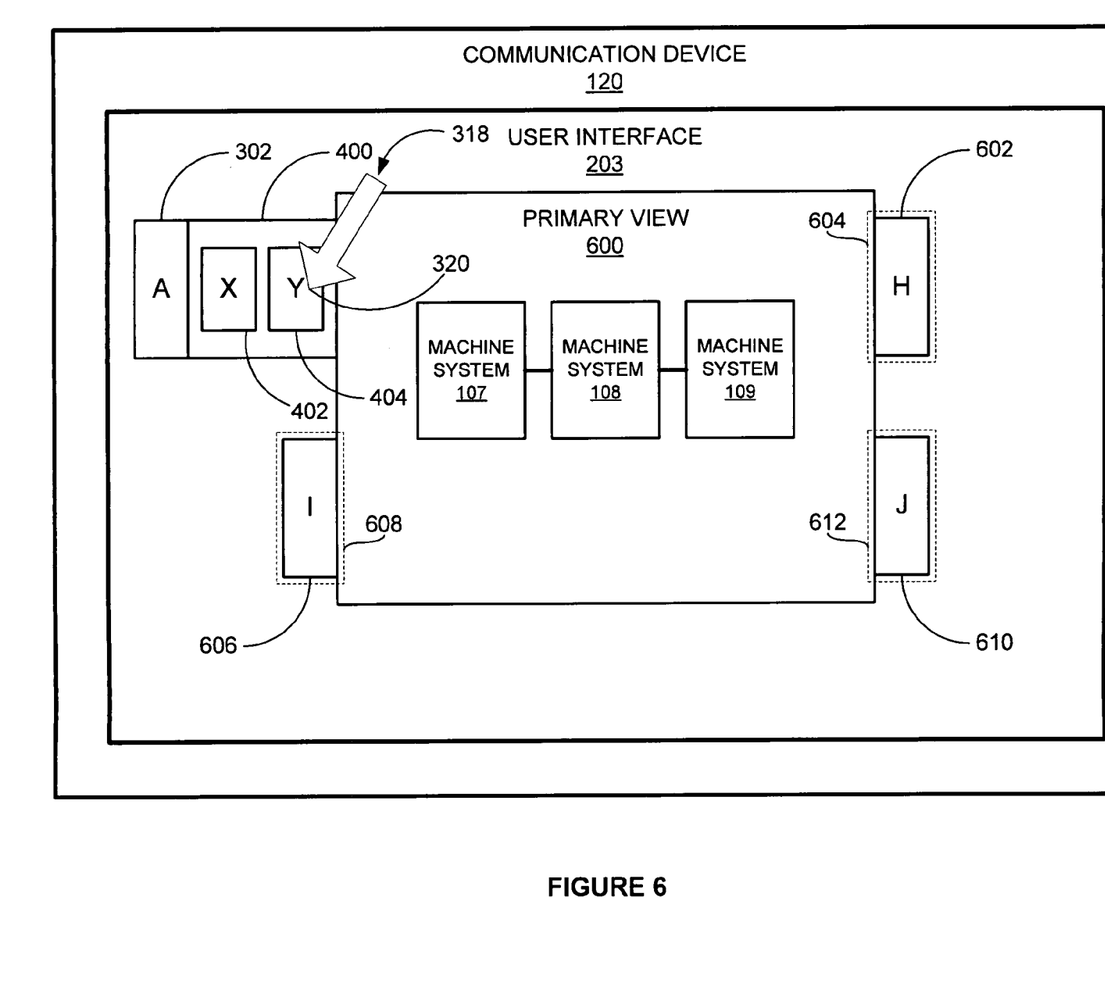
FIG. 6 is a block diagram illustrating a communication device in the process of displaying a graphical representation of an industrial automation environment.

FIG. 6 is a block diagram illustrating communication device 120 in the process of displaying a graphical representation of industrial automation environment 111. FIG. 6 is similar to FIG. 5 with the exception that the user has now selected system Y 404 from within the thumbnail graphic of the human-machine interface displayed in drawer A 400 instead of system X 402. In response to this selection primary view 600 now contains a detailed representation of system Y 404 including machine system 107, machine system 108, machine system 109 and the connections between the machine systems. Primary view 600 may also include any of a wide variety of machine data (not shown) related to machine systems 107 through 109. In this example, primary view 600 may be thought of as a third human-machine interface.

In this example, once system Y 404 was selected, primary view 600 was configured such that tab E 502 and boundary E 504 have been replaced by tab H 602 and boundary H 604. Tab F 506 and boundary F 508 have been replaced by tab I 606 and boundary I 608, while tab G 510 and boundary G 512 have been replaced by tab J 610 and boundary J 612. This change has occurred since the user has selected system Y 404 for closer inspection and the tabs and drawers now contain thumbnail graphics of human-machine interfaces related to system Y 404.

Figure 7:
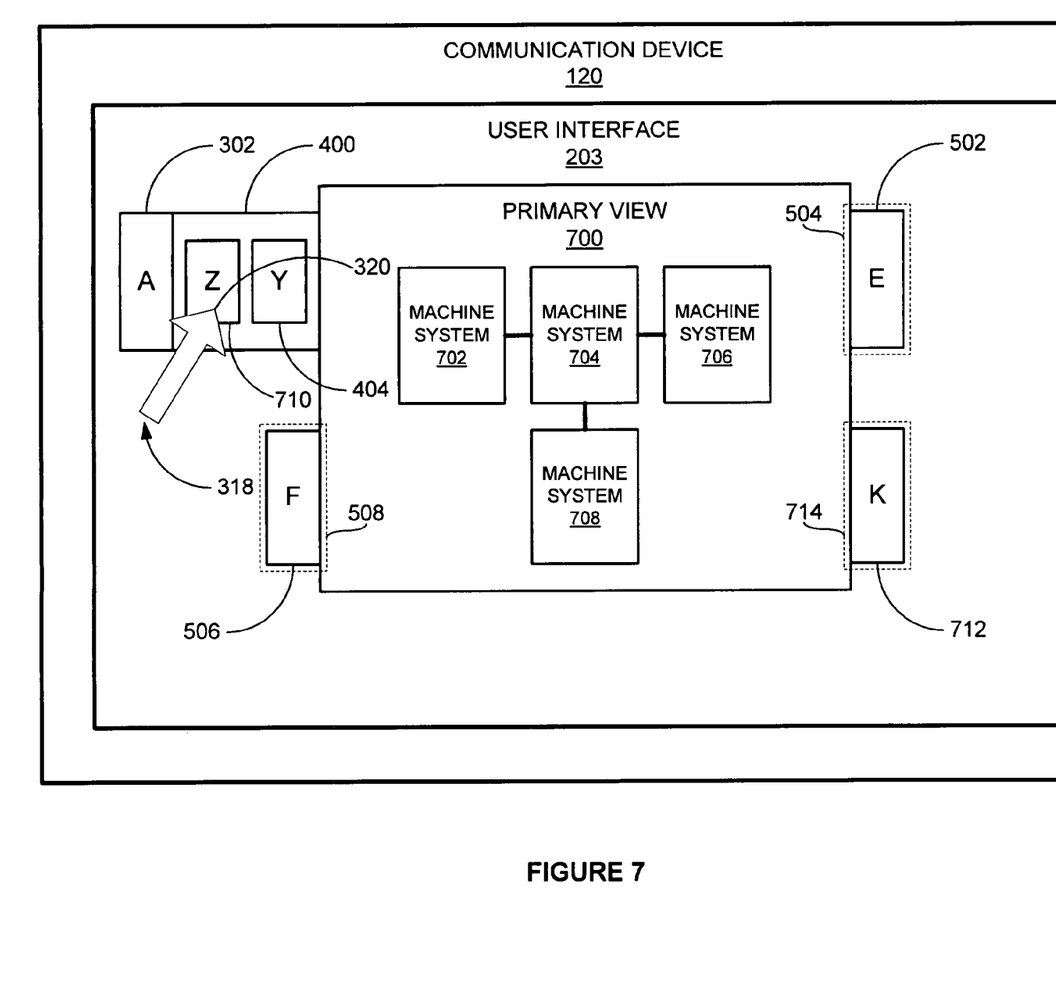
FIG. 7 is a block diagram illustrating a communication device in the process of displaying a graphical representation of an industrial automation environment.

FIG. 7 is a block diagram illustrating communication device 120 in the process of displaying a graphical representation of industrial automation environment 111. In this example, system X 402 within drawer A 400 has changed to system Z 710. This results in the systems displayed in drawer A 400 changing to show the replaced system. Here, the new systems within drawer A 400 includes system Z 710 and system Y 404. Such a change may take place for any of a wide variety of reasons. In this example, system X 402 has been replaced by system Z 710 containing a completely different set of machine systems. This change may be automatically detected by aggregation server 110 and a graphical representation of the changed industrial automation environment 111 may be transmitted to communication device 120 for display.

In this example, primary view 700 now displays machine system 702, machine system 704, machine system 706, machine system, 708 and the connections between the machine systems all corresponding to system Z 710. Since system Z 710 has replaced system X 402, tab E 502 and tab F 506 remain unchanged while tab G 510 and boundary G 512 have been replaced by tab K 712 and boundary K 714. Drawer K may contain a human-machine interface closely related to system Z 710 but irrelevant to system X 402. In this example, primary view 700 may be thought of as a fourth human-machine interface.

Figure 8:
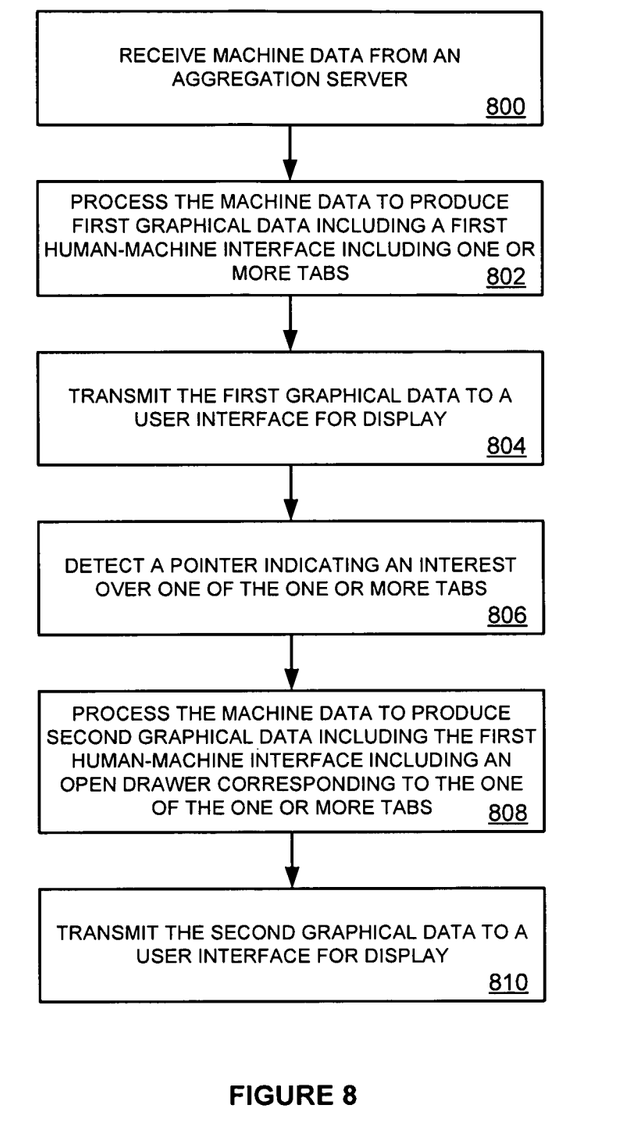
FIG. 8 is a flow chart illustrating a method for displaying a graphical representation of an industrial automation environment.

FIG. 8 is a flow chart illustrating a method for displaying a graphical representation of industrial automation environment 111. In this example, method communication device 120 receives data from aggregation server 110 and generates a graphical representation of industrial automation environment 111 including human-machine interfaces allowing a user to monitor and control machine systems within industrial automation environment 111. Communication device 120 receives machine data from aggregation server 110 (operation 800).

Communication device 120 processes the machine data to produce first graphical data including a first human-machine interface including one or more tabs (operation 802). Communication device 120 transmits the first graphical data to a user interface for display (operation 804).

Communication device 120 detects a pointer (or the active point on a pointer) indicating an interest over one of the one or more tabs (operation 806). Communication device 120 then processes the machine data to produce second graphical data including the first human-machine interface including an open drawer corresponding to the one of the one or more tabs (operation 808). Communication device 120 then transmits the second graphical data to a user interface for display (operation 810).

It should be emphasized that the above-described embodiments are merely possible examples of implementations, merely set forth for a clear understanding of the principles of this disclosure. Many variations and modifications may be made to the above-described embodiments without departing substantially from the spirit and principles of the disclosure. All such modifications and variations are intended to be included herein within the scope of this disclosure.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A human-machine interface comprising: a communication interface configured to receive first machine data from an aggregation server, the aggregation server configured to transfer the first machine data corresponding to a plurality of machines in an industrial environment to the communication interface, receive a plurality of configuration changes of the machines automatically when the configuration changes occur, the configuration changes comprising at least one change in how the machines are coupled together in a new configuration, aggregate the plurality of configuration changes into second machine data, and transfer the second machine data to the communication interface; a user interface configured to display graphical data to a user; and a processor coupled to the communication interface and the user interface, the processor configured to: process the first machine data to produce first graphical data comprising one or more tabs; transmit the first graphical data to the user interface for display; detect a pointer over one of the one or more tabs; process the second machine data to produce second graphical data comprising an open drawer corresponding to the one of the one or more tabs, wherein the drawer includes a thumbnail graphic including the configuration changes; and transmit the second graphical data to the user interface for display; wherein the drawer includes a plurality of thumbnail graphical representations of the plurality of machines arranged within the drawer based on a physical layout of the plurality of machines.

2. The human-machine interface of claim 1 wherein the drawer further includes a thumbnail graphical representation of a machine.

3. The human-machine interface of claim 1 wherein the first machine data includes a physical layout of a plurality of machines.

4. The human-machine interface of claim 3 wherein the first machine data also includes interconnections between the plurality of machines.

5. The human-machine interface of claim 1 wherein the first and second graphical data reflect a hierarchy of machine data.

6. The human-machine interface of claim 1 wherein the aggregation server is configured to update the machine data automatically when configuration changes occur.

7. The human-machine interface of claim 1 wherein the processor is further configured to detect the pointer over one of the tabs by detecting an active point for the pointer remaining at a position within a boundary of the one of the one or more tabs for at least a first amount of time.

8. The human-machine interface of claim 1 wherein the processor is further configured to detect the pointer over one of the tabs by detecting an active point for the pointer staying within a boundary of the one of the one or more tabs for at least a second amount of time.

9. A method for operating a human-machine interface comprising: receiving first machine data from an aggregation server, the first machine data corresponding to a plurality of machines in an industrial environment; processing the first machine data to produce first graphical data comprising one or more tabs; transmitting the first graphical data to a user interface for display; detecting a pointer over one of the one or more tabs; receiving second machine data from the aggregation server incorporating a plurality of configuration changes of the plurality of machines, the configuration changes comprising at least one change in how the machines are coupled together in a new configuration; processing the second machine data to produce second graphical data comprising the first graphical data including an open drawer corresponding to the one of the one or more tabs, wherein the drawer includes a thumbnail graphic including the configuration changes; and transmitting the second graphical data to the user interface for display; wherein the drawer includes a plurality of thumbnail graphical representations of the plurality of machines arranged within the drawer based on a physical layout of the plurality of machines.

10. The method of claim 9 wherein the drawer further includes a thumbnail graphical representation of a machine.

11. The method of claim 9 wherein the first machine data includes a physical layout of the plurality of machines.

12. The method of claim 11 wherein the first machine data also includes interconnections between the plurality of machines.

13. The method of claim 9 wherein the plurality of machines are configured in a hierarchy.

14. The method of claim 9, wherein the aggregation server is configured to update the machine data automatically when configuration changes occur.

15. The method of claim 9 further comprising:
detecting the pointer over one of the tabs by detecting an active point for the pointer remaining at a position within a boundary of the one of the one or more tabs for at least a first amount of time.

16. The method of claim 9 further comprising:
detecting the pointer over one of the tabs by detecting an active point for the pointer staying within a boundary of the one of the one or more tabs for at least a second amount of time.

17. A non-transitory computer-readable medium having instructions stored thereon for operating a computer system, wherein the instructions, when executed by the computer system, direct the computer system to: receive first machine data from an aggregation server, the first machine data corresponding to a plurality of machines in an industrial environment; process the first machine data to produce first graphical data comprising one or more tabs; transmit the first graphical data to a user interface for display; detect a pointer over one of the one or more tabs; receive second machine data from the aggregation server incorporating a plurality of configuration changes of the plurality of machines, the configuration changes comprising at least one change in how the machines are coupled together in a new configuration; process the second machine data to produce second graphical data comprising the first graphical data including an open drawer corresponding to the one of the one or more tabs, wherein the drawer includes a thumbnail graphic including the configuration changes; and transmit the second graphical data to the user interface for display; wherein the drawer includes a plurality of thumbnail graphical representations of the plurality of machines arranged within the drawer based on a physical layout of the plurality of machines.

18. The non-transitory computer-readable medium of claim 17, wherein the instructions, when executed by the computer system, further direct the computer system to:
update the machine data automatically when configuration changes occur.

19. A non-transitory computer-readable medium having instructions stored thereon for operating a computer system, wherein the instructions, when executed by the computer system, direct the computer system to: receive machine data; process the machine data to produce graphical data; display the graphical data; receive configuration changes related to the machine data, the configuration changes comprising at least one change in how machines are coupled together in a new configuration; and open a graphical drawer and display a thumbnail preview of a human-machine interface including the configuration changes within the drawer, in response to either a hovering over, or a clicking on a graphical tab; wherein the drawer includes a plurality of thumbnail graphical representations of the plurality of machines arranged within the drawer based on a physical layout of the plurality of machines.

\* \* \* \* \*